(12) United States Patent
Lee (10) Patent No.: US 10,454,082 B2
(45) Date of Patent: Oct. 22, 2019

(54) BATTERY RACK

(71) Applicant: Samsung SDI Co., Ltd., Yongin-si, Gyeonggi-do (KR)

(72) Inventor: Jun Ho Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 128 days.

(21) Appl. No.: 15/345,188

(22) Filed: Nov. 7, 2016

(65) Prior Publication Data

US 2017/0133642 A1 May 11, 2017

(30) Foreign Application Priority Data

Nov. 9, 2015 (KR) .................. 10-2015-0156831

(51) Int. Cl.
*H01M 2/10* (2006.01)
*H01M 2/20* (2006.01)

(52) U.S. Cl.
CPC ....... *H01M 2/1022* (2013.01); *H01M 2/1016* (2013.01); *H01M 2/20* (2013.01)

(58) Field of Classification Search
CPC .......................... H01M 2/1077; H01M 2/1022
See application file for complete search history.

(56) References Cited

U.S. PATENT DOCUMENTS

| | | | |
|---|---|---|---|
| 6,475,659 B1 * | 11/2002 | Heimer | H01M 2/0262 429/130 |
| 6,638,660 B2 | 10/2003 | Stone et al. | |
| 8,616,384 B1 * | 12/2013 | Tucker | B65D 33/1675 211/85.15 |
| 8,902,723 B2 | 12/2014 | Furuichi et al. | |
| 2002/0179552 A1 * | 12/2002 | Marraffa | H01M 2/1077 211/49.1 |
| 2014/0097797 A1 * | 4/2014 | Hendrix | H01M 2/1077 320/118 |
| 2014/0134460 A1 | 5/2014 | Youn | |

FOREIGN PATENT DOCUMENTS

| KR | 10-2003-0038773 A | 5/2003 |
|---|---|---|
| KR | 20-0459803 Y1 | 4/2012 |
| KR | 10-2014-0061212 A | 5/2014 |
| KR | 10-1574153 B1 | 12/2015 |

* cited by examiner

*Primary Examiner* — Matthew J Merkling
(74) *Attorney, Agent, or Firm* — Lewis Roca Rothgerber Christie LLP (57) ABSTRACT

A battery rack includes: a plurality of frames, the frames being coupled to each other to form an accommodation space, and at least one of the frames comprising a mount; and a plurality of battery trays, each of the battery trays being configured to be arranged in the accommodation space. Each of the battery trays includes: a tray body configured to accommodate a plurality of unit packs; and a tray plate coupled to the tray body. The tray plate includes a connector configured to be coupled to the mount to ground the battery tray to the frames. One of the mount and the connector includes a protrusion, and the other of the mount and the connector includes an accommodation part configured to be complementarily coupled with the protrusion.

9 Claims, 5 Drawing Sheets

BATTERY RACK

CROSS-REFERENCE TO RELATED APPLICATION

This application claims priority to and the benefit of Korean Patent Application No. 10-2015-0156831, filed on Nov. 9, 2015 in the Korean Intellectual Property Office, the content of which is incorporated herein by reference in its entirety.

BACKGROUND

1. Field

Embodiments of the present invention relate to a battery rack.

2. Description of the Related Art

An energy storing system is configured to be coupled to an energy source, such as a regenerative energy power system, for example, a solar cell, and is configured to store power when power demanded by a load is relatively small and to use the stored power when power demanded by the load is relatively high. The energy storing system is, for example, an energy storage device including a large number of secondary batteries, such as those used in electronic devices, for example, those used in a mobile phone and a notebook computer.

In the energy storing system, a plurality of battery trays, each of which is a unit module including a large number of secondary batteries, may be mounted in a battery rack.

Generally, the energy storing system is grounded by connecting a rack frame and the battery trays to each other via separate ground wires or by fastening the rack frame and the battery trays to each other by using bolts.

However, when the energy storing system is grounded by the separate bolt fastening method, it is difficult to ground the components of the energy storing system due to a complicated configuration.

SUMMARY

Aspects of the present invention provide a battery rack that reduces or minimizes unintentional breakage or disconnection of a ground connection by sufficiently securing a mutual contact area between a rack frame and a battery tray.

An exemplary embodiment of the present invention provides a battery rack including: a plurality of frames, the frames being coupled to each other to form an accommodation space, and at least one of the frames including a mount; and a plurality of battery trays. Each of the battery trays are configured to be arranged in the accommodation space and includes: a tray body configured to accommodate a plurality of unit packs; and a tray plate coupled to the tray body. The tray plate includes a connector configured to be coupled to the mount to ground the battery tray to the frames. One of the mount and the connector includes a protrusion, and the other of the mount and the connector includes an accommodation part configured to be complementarily coupled with the protrusion.

The plurality of frames may include: an upper frame; a lower frame; and a plurality of side frames. The upper and lower frames may form upper and lower sides, respectively, of the battery rack and may extend in a first direction. The plurality of side frames may extend in a second direction orthogonal to the first direction between the upper frame and the lower frame. The mount may be at one or more of the side frames.

The tray plate may include: a first plate on which the tray body is arranged; and a second plate extending vertically with respect to the first plate and configured to at least partially cover an opening at a front side of the accommodation space when the battery tray is accommodated in the accommodation space. The connector may be on the second plate.

The second plate may be longer than the tray body in the first direction and may include expanded portions which respectively extend past opposite ends of the tray body in the first direction. The connector may be at one or more of the expanded portions.

The tray plate, except for the connector, may be painted.

The battery tray may be configured to move in a third direction orthogonal to the first and second directions to be accommodated in the accommodation space.

The mount may include the protrusion, and the connector may include the accommodation part. The protrusion may protrude from the side frame in the third direction.

The accommodation part may protrude from one or more of the expanded portions in the third direction.

A diameter of the protrusion may increase and then decrease along the third direction. The accommodation part may be a leaf spring having a circular arc shape configured to surround at least a portion of an outer circumferential surface of the protrusion, and the battery tray may be configured to slide in the third direction such that the protrusion and the accommodation part are coupled to each other.

The mount may include the accommodation part, and the connector may include the protrusion. The protrusion may protrude from one or more of the expanded portions in the third direction.

The mount may include the accommodation part, and the connector may include the protrusion. The protrusion may protrude from one or more of the expanded portions in the third direction. The protrusion may be a leaf spring having a circular arc shape in which a distance between arms of the leaf spring increases from a first distance to a second distance and then decreases to a third distance along the third direction, and the accommodation part may be an opening having a size that is smaller than second distance.

As described above, in the battery rack according to exemplary embodiments of the present invention, a contact region between the rack frame and the battery tray may be firmly implemented by providing mutually corresponding contact regions in the rack frame and the battery tray, thereby reducing or minimizing unintentional breakage or disconnection of a ground of the battery rack.

BRIEF DESCRIPTION OF THE DRAWINGS

Exemplary embodiments of the present invention will now be described more fully hereinafter with reference to the accompanying drawings; however, the present invention may be embodied in many different forms and should not be construed as being limited to the exemplary embodiments set forth herein. Rather, these embodiments are provided so that this disclosure will be thorough and complete and will fully convey the scope of the present invention to those skilled in the art.

In the figures, dimensions may be exaggerated for clarity of illustration. Like reference numerals refer to like elements throughout.

DETAILED DESCRIPTION

Other aspects of the present invention will be described in, or will be obvious from, the detailed description and the drawings.

Aspects and features of the present invention, and methods of achieving the aspects and features, will be clear with reference to exemplary embodiments described in detail below, together with the accompanying drawings.

However, the present invention is not limited to the exemplary embodiments set forth below and may be embodied in various other forms. The presented exemplary embodiments are for rendering the description of the present invention complete and are set forth to provide a complete understanding of the scope of the present invention to a person of ordinary skill in the technical field to which the present invention pertains.

It will be understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 1:
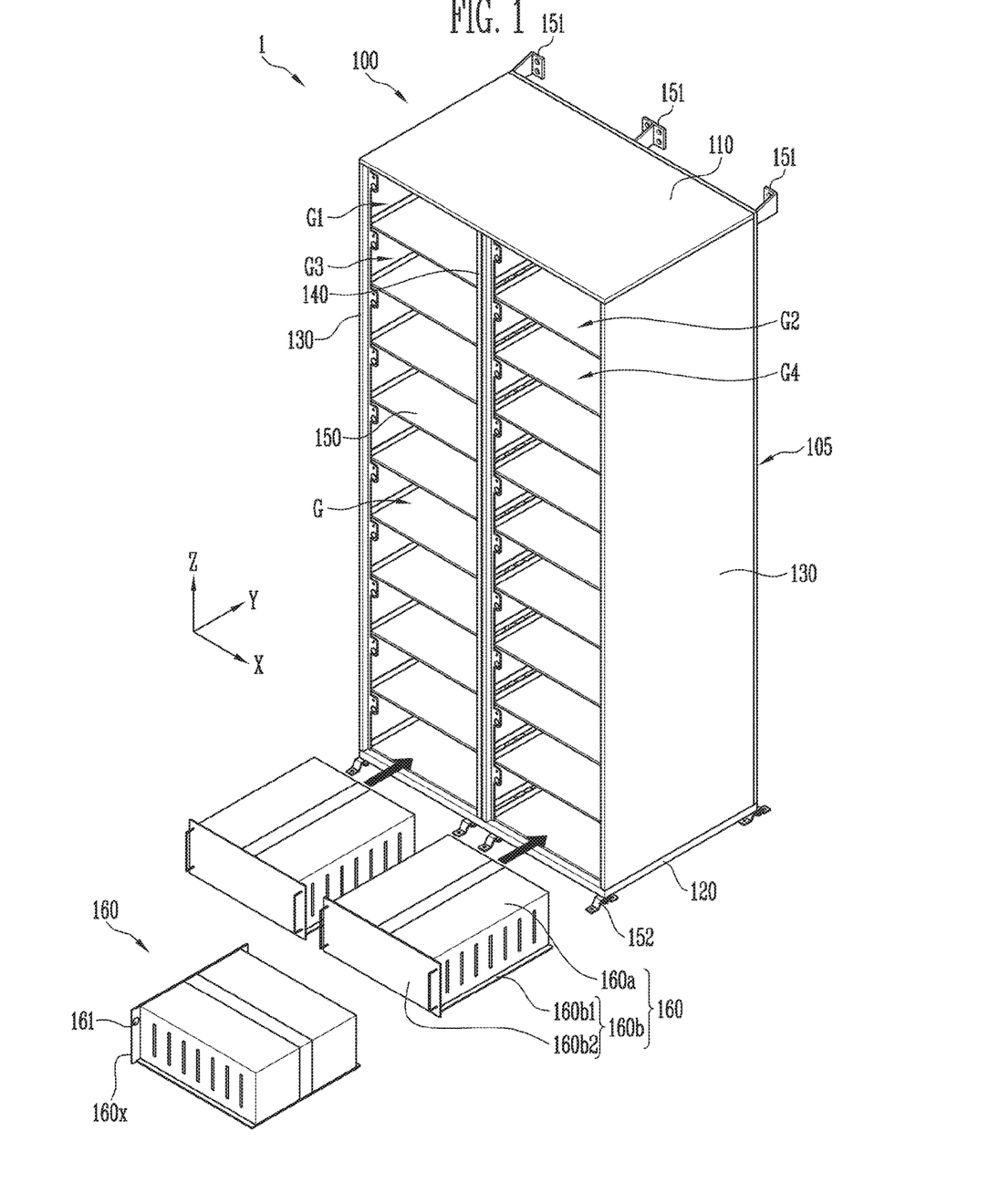
FIG. 1 is an exploded perspective view illustrating an energy storing system according to an exemplary embodiment of the present invention.
Figure 2:
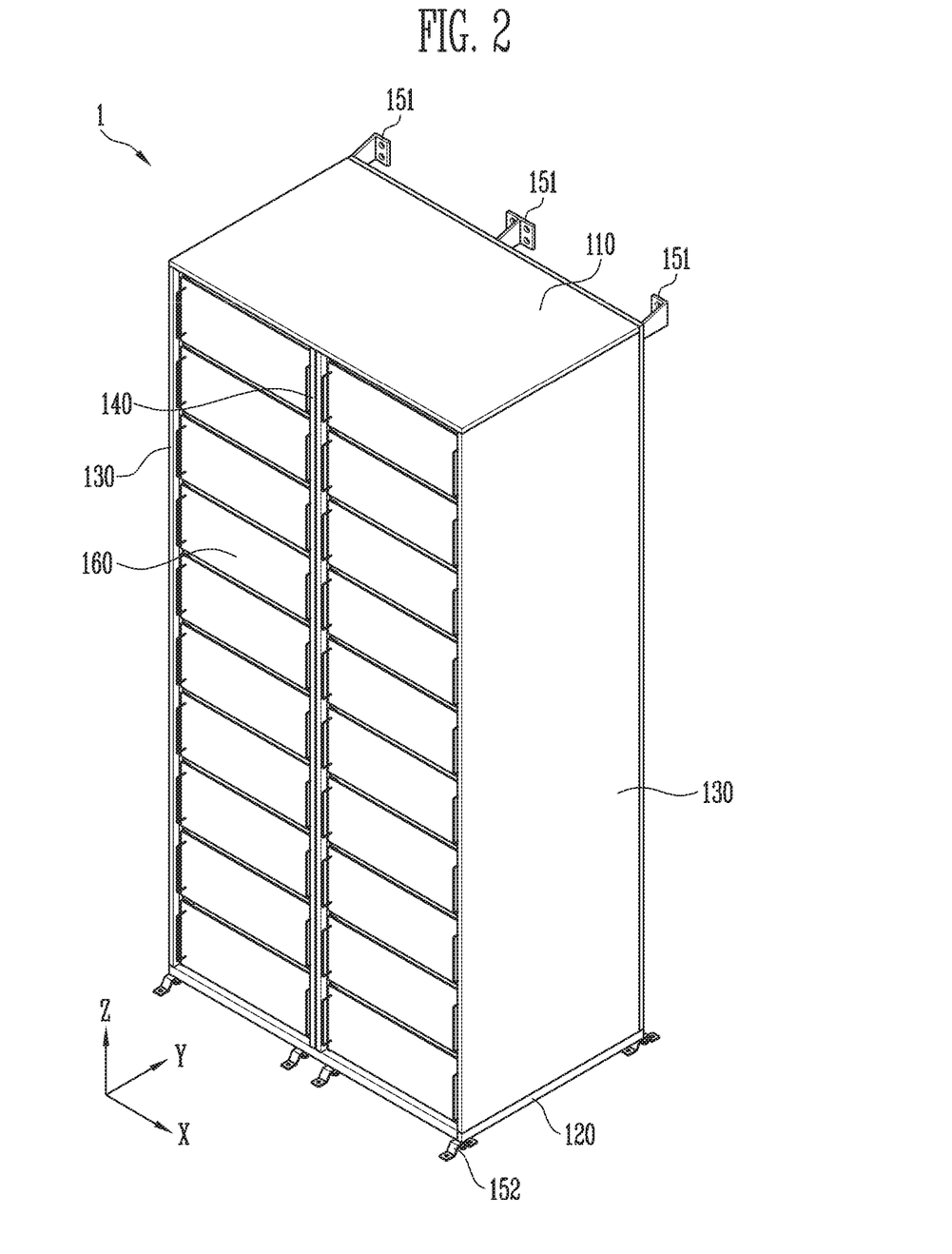
FIG. 2 is a perspective view illustrating a state in which a battery tray is accommodated in a battery rack illustrated in FIG. 1.

FIG. 1 is an exploded perspective view illustrating an energy storing system according to an exemplary embodiment of the present invention, and FIG. 2 is a perspective view illustrating a state in which a battery tray is accommodated in a battery rack illustrated in FIG. 1.

Referring to FIGS. 1 and 2, an energy storing system 1 according to an exemplary embodiment of the present invention includes a battery rack 100 and a plurality of battery trays 160 accommodated in the battery rack 100.

The battery rack 100 includes a rack frame 105 for accommodation the plurality of battery trays 160 and first and second fixing members 151 and 152 formed at least at one side of the rack frame 105 (e.g., the first and second fixing members 151 and 152 may be formed at opposite sides of the rack frame 105) to fix the rack frame 105 to, for example, a wall body of a holding space in which the rack frame 105 is positioned.

The rack frame 105 accommodates the plurality of battery trays 160 in an accommodation space G and includes (e.g., provides) a connector for a power connection and a communication connection between the plurality of battery trays 160. Further, in the rack frame 105, the accommodation space G is divided into a plurality of sub-accommodation spaces G1-G4, and each of the sub-accommodation spaces G1-G4 are configured to accommodate one of the plurality of battery trays 160 with high integration. For convenience of description, only the sub-accommodation spaces G1-G4 are indicated and discussed herein. However, in the embodiment illustrated in FIG. 1, the rack frame 105 includes twenty sub-accommodation spaces. Furthermore, the present invention is not limited thereto, and the rack frame 105 may include any number of sub-accommodation spaces according to an intended power capacity of the energy storing system 1.

Some of the plurality of sub-accommodation spaces (e.g., the sub-accommodation spaces G1 and G3 and the sub-accommodation spaces G2 and G4) may be arranged in a vertical direction Z, and adjacent ones of the sub-accommodation spaces arranged in the vertical direction Z may be separated by a rack member 150 (e.g., the accommodation space G may be divided into the sub-accommodation spaces at least in part by rack members 150).

The sub-accommodation spaces may be arranged in one column or two columns extending in the vertical direction Z and adjacent to each other in the horizontal direction X, but the present invention is not limited thereto. In some embodiments, the sub-accommodation spaces may be arranged in three or more columns. For example, adjacent ones of the sub-accommodation spaces in the horizontal direction X (e.g., the sub-accommodation spaces G1 and G2 and the sub-accommodation spaces G3 and G4) may be separated by a side frame 130 and/or by a center frame 140 (e.g., the accommodation space G may be further divided into the sub-accommodation spaces by the side frame 130 and/or the center frame 140). The accommodation space G may be divided into a certain number of sub-accommodation spaces to accommodate a corresponding number of the battery trays 160 according to an intended power capacity of the energy storing system 1.

The rack frame 105 includes an upper frame 110, side frames 130 vertically extending from the upper frame 110 in a down direction (e.g., in the vertical direction Z), the center frame 140, which is installed between and parallel with the side frames 130, and a lower frame 120 connected to the side frames 130 and the center frame 140 and at a lower side of the side frames 130 and the center frame 140 (e.g., at a side of the side frames 130 and the center frame 140 opposite the upper frame 110).

The frames 110, 120, 130, and 140 may form an exterior appearance (e.g., an external surface) of the rack frame 105 such that the exterior of the rack frame 105 is an approximately hexagonal shape.

For example, the upper frame 110 and the lower frame 120 extend in the horizontal direction X at the upper and lower sides of the rack frame 105, and the side frames 130 extend between the lower frame 120 and the upper frame 110 in the vertical direction Z so as to connect the lower frame 120 and the upper frame 110 to each other.

The side frame 130 may extend in the vertical direction Z while crossing side surfaces (e.g., while extending past side surfaces) of the sub-accommodation spaces in which the battery trays 160 are accommodated and may divide the accommodation space G into one or more columns of the sub-accommodation spaces in the vertical direction Z. The center frame 140 may be arranged between the side frames 130 in the horizontal direction X and may extend in the vertical direction Z to divide the accommodation space G into the sub-accommodation spaces.

For example, the lower frame 120, the upper frame 110, the side frames 130, and the center frame 140 may each be an individual member and may together form a framework of the rack frame 105 by being coupled to each other.

In one embodiment, the lower frame 120, the upper frame 110, the side frames 130, and the center frame 140 may be coupled to each other by a permanent coupling scheme or method, such as by welding or, in another embodiment, may be fastened so as to be disassembled (e.g., may be removably fastened or coupled) by a mechanical fastening method, such as by screw-coupling.

The lower frame 120 may protect the battery trays 160 accommodated in the rack frame 105 from an external impact and may serve as a holding stand for transport equipment, thereby providing convenience for a transport operation of the rack frame 105.

The first and second fixing members 151 and 152, which provide vibration resistance to the rack frame 105, may be installed at upper and lower sides of the rack frame 105. The first fixing member 151 may be at or formed in the upper frame 110 or may be at a corner portion where the upper frame 110 and one of the side frames 130 contact each other. The second fixing member 152 may be at or formed in the lower frame 120.

The first and second fixing members 151 and 152, together with the rack frame 105, form the battery rack 100.

The rack members 150 may be generally arranged at equal intervals along the vertical direction Z in the rack frame 105 so as to provide the sub-accommodation spaces for the battery trays 160.

A front side of the accommodation space G (e.g., a front side of the sub-accommodation spaces) is an opening opened to the outside. The battery trays 160 are configured to be fit through the opening and may be guided into respective ones of the sub-accommodation spaces by the rack member 150 and the frame members 110, 120, 130, and/or 140. The battery trays 160 may be seated on the rack member 150 while being slid into the sub-accommodation spaces in a direction Y (hereinafter, for convenience of the description, referred to as an "accommodation direction Y") orthogonal to the vertical direction Z and the horizontal direction X.

The battery trays 160 are arranged in the rack frame 105 in one or more columns in the vertical direction Z. In the embodiment illustrated in FIGS. 1 and 2, the battery trays 160 are arranged in two columns with the center frame 140 extending between the battery trays 160 in one column and the battery trays 160 in an adjacent column. However, the present invention is not limited thereto.

A heat-radiating structure (e.g., an air-cooling structure) may be applied to the rack frame 105 to radiate heat from the battery trays 160. For example, an opening may be formed in a front surface of the rack frame 105 (e.g., the front surface of the rack frame 105 may remain uncovered) so that low-temperature outside air may smoothly flow into the rack frame 105 with minimal flow resistance.

A back circuit board is provided on a rear surface of the rack frame 105 to provide an electric connection with the battery trays 160. The back circuit board has an opening so that air (e.g., the outside air received through the opening in the front surface of the rack member 150) may be smoothly discharged from the rack frame 105.

A plurality of vent openings (e.g., vent holes) for facilitating heat radiation may be formed in the rack frame 105.

Each of the battery trays 160, according to an exemplary embodiment of the present invention, includes a tray body 160a, in which a plurality of unit packs (e.g., battery packs or battery cells) are packaged and arranged into a single unit, and a tray plate 160b on which the tray body 160a is mounted. The tray plate 160*b* includes a connector 161 (e.g., a contact part) which is configured to contact a mount 131 of the rack frame 105 to ground the battery rack 100.

Further, the tray plate 160*b*, according to an exemplary embodiment of the present invention, may include a first plate 160*b*1 supporting the weight of the tray body 160*a* and a second plate 160*b*2 which is vertically oriented with respect to the first plate 160*b*1. When the battery tray 160 is in a respective one of the sub-accommodation spaces, the second plate 160*b*2 at least partially covers an opening opened to the outside at the front side of the sub-accommodation space.

In one embodiment, the connector 161 of the tray plate may be provided in (e.g., may be mounted to) the second plate 160*b*2 of the tray plate 160*b*.

Further, according to an exemplary embodiment of the present invention, the second plate 160*b*2 may be longer than the tray body 160*a* in the horizontal direction X such that respective expanded portions 160*x* of the second plate 160*b*2 extend past opposite ends of the tray body 160*a* in the horizontal direction X.

In one embodiment, the connector 161 of the tray plate 160*b* may be provided in or mounted to one or both of the expanded portions 160*x*.

The plurality of battery trays 160 are arranged in the rack frame 105 and are coupled to each other in a serial and/or parallel connection to form the energy storing system 1.

Each of the battery trays 160 may include the unit packs, which are seated in the vertical direction Z and have a flat shape. A power terminal, which draws out a discharging current to an external load or inputs a charging current from an external power supply device, may be provided in each of the battery trays 160.

Further, the remaining portions of the battery trays 160 other than the connector 161 that are in contact with the mount 131 of the rack frame are paint-processed (e.g., are painted and/or coated) in order to prevent corrosion. For example, the connector 161 may be positioned in the second plate 160*b*2 of the tray plate 160*b* and may be shielded by a sticker or the like when the battery tray 160 is painted. The connector 161 may then be exposed after completion of the painting process to be connected to the mount 131 of the rack frame 105 when the battery tray 160 is accommodated in the sub-accommodation space of the rack frame 105 to ground the battery tray 160 to the rack frame 105.

Figure 3:
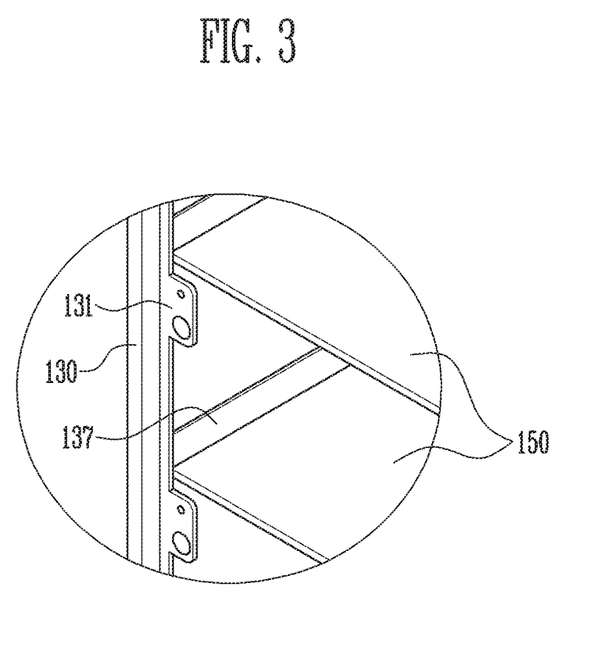
FIG. 3 is a diagram schematically illustrating a side frame and a rack member illustrated in FIG. 1.

FIG. 3 is a diagram schematically illustrating the side frame 130 and the rack member 150 shown in FIG. 1.

Referring to FIGS. 1 and 3, the side frame 130 includes guide plates 137 fixing the rack members 150, which divide the accommodation space G of the rack frame 105 into the sub-accommodation spaces, to the rack frame 105. The guide plate 137 has a length corresponding to a width of the side frame 130, and the guide plate 137 is coupled to the side frame 130 by a fastener, such as a bolt.

The side frame 130, according to an exemplary embodiment of the present invention, includes the mount 131 for contacting and to be coupled to the connector 161 of the tray plate 160*b*.

For example, when the battery tray 160 is accommodated in the sub-accommodation space of the rack frame 105, the connector 161 positioned in the second plate 160*b*2 of the tray plate 160*b* may be in direct contact with the mount 131 of the side frame 130 to ground the battery tray 160 to the rack frame 105.

Hereinafter, a coupling configuration of the mount 131 of the side frame 130 and the connector 161 positioned in the second plate 160*b*2 of the tray plate 160*b* according to an exemplary embodiment of the present invention will be described in more detail with reference to FIGS. 4 to 11.

According to an exemplary embodiment of the present invention, the mount 131 of the side frame 130 and the connector 161 of the tray plate 160*b* are in contact with each other and have sufficient contact area therebetween to be firmly coupled to each other, thereby reducing or minimizing unintentional breakage of the ground connection due to an external impact and the like.

Figure 4:
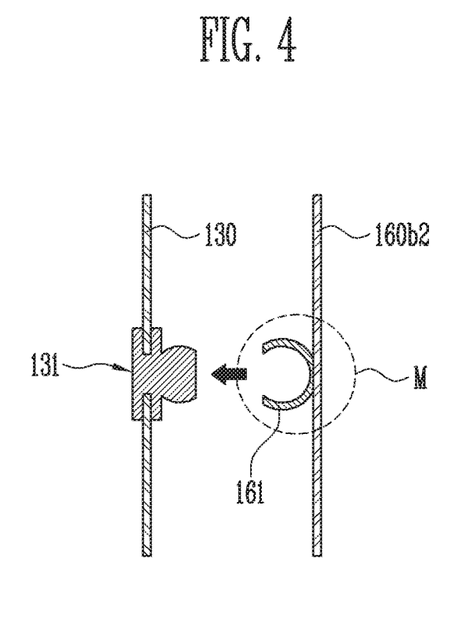
FIG. 4 is a cross-sectional view schematically illustrating a contact portion of the side frame and a tray plate illustrated in FIG. 1 according to a first exemplary embodiment of the present invention.
Figure 5:
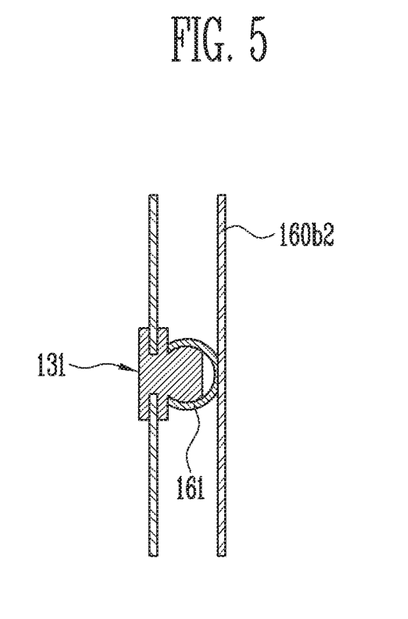
FIG. 5 is a diagram illustrating a coupled state of the side frame and the tray plate illustrated in FIG. 4.

FIG. 4 is a cross-sectional view schematically illustrating the connector of the side frame 130 and the tray plate 106*b* illustrated in FIG. 1 according to a first exemplary embodiment of the present invention, and FIG. 5 is a diagram illustrating a coupled state of the side frame 130 and the tray plate 160*b* illustrated in FIG. 4.

As illustrated in FIGS. 4 and 5, according to the first exemplary embodiment of the present invention, the mount 131 of the side frame 130 includes a protrusion, and the connector 161 of the second plate 160*b*2 of the tray plate 160*b* includes an accommodation part corresponding to (e.g., complementarily to) the protrusion to be coupled thereto. In this embodiment of the present invention, for convenience of the description, it is assumed that that mount 131 of the side frame 130 is the protrusion itself (e.g., the protrusion is integrally formed with the mount 131) and that the connector 161 of the second plate 160*b*2 includes the accommodation part itself (e.g., the accommodation part is integrally formed with the connector 161).

The protrusion 131 may extend to protrude from the side frame 130 in a direction facing or parallel with the accommodation direction Y of the battery tray 160. For example, the protrusion 131 may have a protrusion shape (e.g., a bulbous shape or the like) in which a diameter increases and then decreases along the accommodation direction Y. The protrusion 131 may be a pop nut, and the pop nut may be installed in the side frame 130 such that a head of the pop nut is positioned to face the second plate 160*b*2.

Further, the accommodation part 161 may extend to protrude from one of the expanded portions 160*x* of the second plate 160*b*2 in the accommodation direction Y so as to be complementarily coupled with the protrusion 131. The accommodation part 161 may be, for example, a leaf spring having a circular arc shape or a semicircle shape so as to surround at least a portion of an external peripheral surface of the protrusion 131.

Accordingly, as the battery tray 160 is slid into the sub-accommodation space in the accommodation direction Y, the protrusion 131 and the accommodation part 161 are fitted to each other and, thus, are firmly coupled to each other and a contact area between the protrusion 131 and the accommodation part 161 is relatively large.

Furthermore, a region M indicated in FIG. 4 represents a region which is masked during the painting operation of the tray plate 160*b* described above (the region M indicating the same in FIGS. 6, 8, and 10), and thus, the connector 161 of the second plate 160*b*2 is electrically connected with the mount 131 of the side frame 130 to ground the battery rack 100.

As described above, according to an embodiment of the present invention, even though an external impact and the like may be applied to the battery rack 100, the mount 131 of the side frame 130 and the connector 161 of the tray plate 160*b* are prevented from being unintentionally separated from each other or mis-located, thereby preventing the ground of the battery rack from being unintentionally broken.

In the first exemplary embodiment, the mount 131 of the side frame 130 is the protrusion and the connector 161 of the second plate 160b2 is the complementary accommodation part to the protrusion 131. However, in a second embodiment, the connector 161 of the second plate 160b2 may be the protrusion and the mount 131 of the side frame 130 may be the complementary accommodation part to the protrusion. Hereinafter, the mount 131 of the side frame 130 and the connector 161 of the second plate 160b2 according to the second embodiment will be described in more detail with reference to FIGS. 6 and 7.

Figure 6:
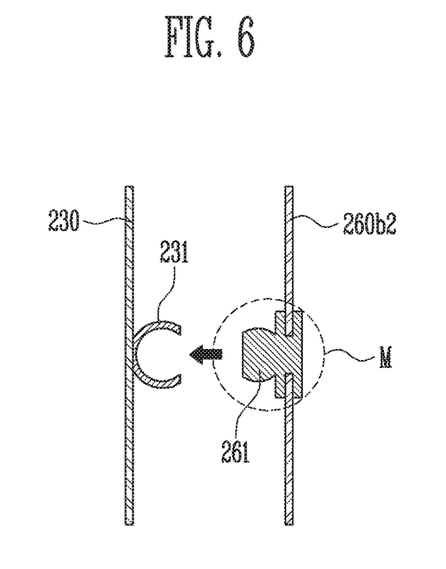
FIG. 6 is a cross-sectional view schematically illustrating a contact portion of a side frame and a tray plate according to a second exemplary embodiment of the present invention.
Figure 7:
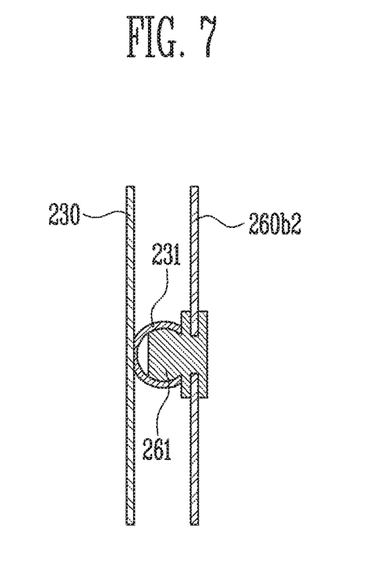
FIG. 7 is a diagram illustrating a coupled state of the side frame and the tray plate illustrated in FIG. 6.

FIG. 6 is a cross-sectional view schematically illustrating a second exemplary embodiment of the present invention, including a side frame and a tray plate, and FIG. 7 is a diagram illustrating a coupled state of the side frame and the tray plate illustrated in FIG. 6.

Referring to FIGS. 6 and 7, a connector 261 of the second plate 260b2 of the tray plate may include a protrusion, and a mount 231 of the side frame 230 may include an accommodation part correspondingly shaped with respect to (e.g., complementarily coupled with) the protrusion. For convenience of the description with respect to this embodiment, it is assumed that the connector 261 of the second plate 260b2 is the protrusion itself and that the mount 231 of the side frame 230 is the accommodation part itself. Furthermore, for convenience of the description, only the features that are different between the side frames 130 and 230 and between the second plates 160b2 and 260b2 may be described, while the features that are the same may not be again described.

In this embodiment, the protrusion 261 may extend from one of the expanded portions of the second plate 260b2 in the accommodation direction Y and may have a protrusion shape, of which a diameter increases and then decreases along the accommodation direction Y.

Further, the accommodation part 231 may extend to protrude from the side frame 230 in the direction facing or parallel with the accommodation direction Y so as to be complementarily coupled with the protrusion 261. The accommodation part 231 may be a leaf spring having a circular arc shape or a semicircle shape to surround at least a portion of an external peripheral surface of the protrusion 261.

Accordingly, as the battery tray is slid into the sub-accommodation space in the accommodation direction Y, the protrusion 261 and the accommodation part 231 are fitted to each other and, thus, are firmly coupled to each other and a contact area of the protrusion 261 and the accommodation part 231 may be relatively large, thereby preventing the ground of the battery rack from being unintentionally broken.

Figure 8:
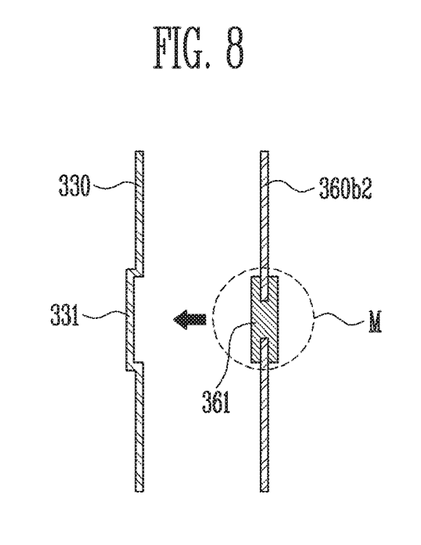
FIG. 8 is a cross-sectional view schematically illustrating a side frame and a tray plate according to a third exemplary embodiment of the present invention.
Figure 9:
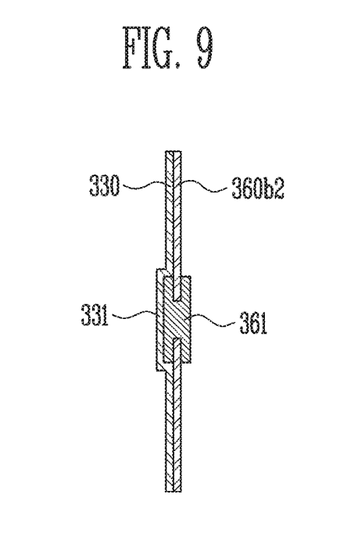
FIG. 9 is a diagram illustrating a coupled state of the side frame and the tray plate illustrated in FIG. 8.

FIG. 8 is a cross-sectional view schematically illustrating a side frame and a tray plate according to a third exemplary embodiment of the present invention, and FIG. 9 is a diagram illustrating a coupled state of the side frame and the tray plate illustrated in FIG. 8.

As illustrated in FIGS. 8 and 9, according to the third exemplary embodiment of the present invention, a connector 361 of the second plate 360b2 includes a protrusion and a mount 331 of the side frame 330 includes an accommodation part correspondingly shaped with respect to (e.g., complementarily coupled with) the protrusion. The mount 331 of the side frame 330 may be the accommodation part shaped like " ⊏ ". The connector 361 of the second plate 360b2 may be the protrusion 361 complementarily shaped with respect to the accommodation part. The protrusion 361 may be a pop nut. Furthermore, for convenience of the description, only the features that are different between the side frames 130 and 330 and between the second plates 160b2 and 360b2 may be described, while the features that are the same may not be again described.

In this embodiment, when the battery tray is accommodated in the sub-accommodation space of the rack frame 105, the protrusion 361 and the accommodation part 331 are fitted to each other and are firmly coupled to each other. Further, a contact area of the protrusion 361 and the accommodation part 331 may be relatively large, thereby effectively preventing the ground of the battery rack from being unintentionally broken.

Figure 10:
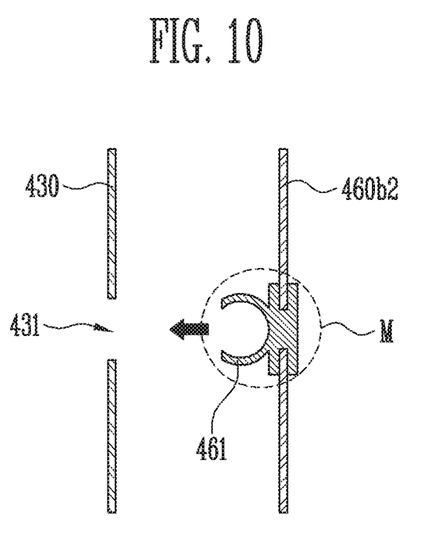
FIG. 10 is a cross-sectional view schematically illustrating a side frame and a tray plate according to a fourth exemplary embodiment of the present invention.
Figure 11:
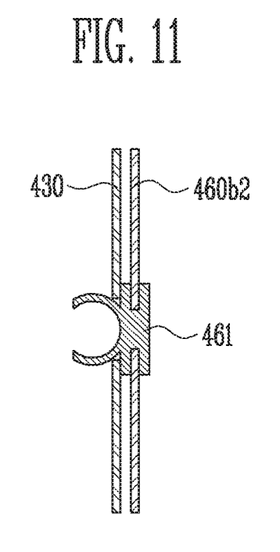
FIG. 11 is a diagram illustrating a coupled state of the side frame and the tray plate illustrated in FIG. 10

FIG. 10 is a cross-sectional view schematically illustrating a side frame and a tray plate according to a fourth exemplary embodiment of the present invention, and FIG. 11 is a diagram illustrating a coupled state of the side frame and the tray plate illustrated in FIG. 10.

As illustrated in FIGS. 10 and 11, according to the fourth exemplary embodiment of the present invention, a connector 461 of the second plate 460b2 includes a protrusion and a mount 431 of the side frame 430 includes an accommodation part to be complementarily coupled with the protrusion. The mount 431 of the side frame 430 may be the accommodation part, and the accommodation part may be an opening extending through the side frame 430 (e.g., the accommodation part may be an opening in the side frame 430 or may be an opened through-hole in the side frame 430), and the connector 461 of the second plate 460b2 may be the protrusion complementary to the accommodation part.

In this embodiment, the protrusion 461 may be a leaf spring having a circular arc shape or a semicircle shape extending to protrude from the expanded portion in the accommodation direction Y, and as illustrated in FIGS. 10 and 11, a distance between two arms of the leaf spring, which are spaced from each other, may increase from a first distance to a second distance and then decrease to a third distance along the accommodation direction Y. The third distance may be equal to the first distance.

The protrusion 461 may be fitted to the mount 431 in the side frame 430, which is an opening in the side frame 430, such that the battery tray is hook-fastened to the side frame 430. To accomplish the hook-fastening, the mount 431 in the side frame 430, which is the opening, may have a size (e.g., a width or diameter) smaller than the second distance (e.g., may have a size corresponding to the first distance).

Accordingly, when the battery tray is accommodated in the sub-accommodation space of the rack frame 105, the protrusion 461 is inserted into the mount 431 in the side frame 430 so that the side frame 430 and the tray plate may be coupled to each other and electrically connected to each other to ground the battery rack.

For example, because the protrusion 461 has a spring structure that compresses when it is inserted into the mount 431 in the side frame 430 and expands when it is fully inserted into the mount 431, the second plate 460b2 and the side frame 430 may be in firm contact with each other.

Accordingly, even though an external impact and the like may be applied to the battery rack 100, the side frame 430 and the tray plate are prevented from being unintentionally separated from each other or mis-located due to the mount 431 and the connector 461, thereby preventing the ground of the battery rack from being broken.

It will be appreciated by those skilled in the art that the present invention, exemplary embodiments of which are described above, may be implemented in other forms without departing from the technical spirit thereof. Thus, it is to be appreciated that the exemplary embodiments described above are intended to be illustrative and not restrictive. The scope of the present invention is represented by the claims, to be described below, and their equivalents, and it is to be understood that the meaning and scope of the claims and all the changes or modified forms derived from the equivalents thereof fall within the scope of the present invention.

What is claimed is:

1. A battery rack comprising:
 a plurality of frames, the frames being coupled to each other to form an accommodation space, and at least one of the frames comprising a mount; and
 a plurality of battery trays, each of the battery trays being configured to be arranged in the accommodation space and comprising:
  a tray body configured to accommodate a plurality of unit packs; and
  a tray plate coupled to the tray body, the tray plate comprising:
   a first plate on which the tray body is arranged;
   a second plate extending vertically with respect to the first plate and configured to at least partially cover an opening at a front side of the accommodation space when the battery tray is accommodated in the accommodation space, and
   a connector on the second plate, the connector being configured to be coupled to the mount to electrically ground the battery tray to the frames via the connector,
 wherein one of the mount and the connector comprises a protrusion, and the other of the mount and the connector comprises an accommodation part configured to be complementarily coupled with the protrusion, and
 wherein the second plate, except for the connector and a portion of the second plate adjacent the connector, is painted to prevent corrosion.

2. The battery rack of claim 1, wherein the plurality of frames comprises:
 an upper frame and a lower frame, the upper and lower frames forming upper and lower sides, respectively, of the battery rack and extending in a first direction; and
 a plurality of side frames extending in a second direction orthogonal to the first direction between the upper frame and the lower frame, and
 wherein the mount is at one or more of the side frames.

3. The battery rack of claim 2, wherein the second plate is longer than the tray body in the first direction and comprises expanded portions which respectively extend past opposite ends of the tray body in the first direction, and
 wherein the connector is at one or more of the expanded portions.

4. The battery rack of claim 3, wherein the battery tray is configured to move in a third direction orthogonal to the first and second directions to be accommodated in the accommodation space.

5. The battery rack of claim 4, wherein the mount comprises the protrusion, and the connector comprises the accommodation part, and
 wherein the protrusion protrudes from the side frame in the third direction.

6. The battery rack of claim 5, wherein the accommodation part protrudes from one or more of the expanded portions in the third direction.

7. The battery rack of claim 6, wherein a diameter of the protrusion increases and then decreases along the third direction,
 wherein the accommodation part is a leaf spring having a circular arc shape configured to surround at least a portion of an outer circumferential surface of the protrusion, and
 wherein the battery tray is configured to slide in the third direction such that the protrusion and the accommodation part are coupled to each other.

8. The battery rack of claim 4, wherein the mount comprises the accommodation part, and the connector comprises the protrusion, and
 wherein the protrusion protrudes from one or more of the expanded portions in the third direction.

9. The battery rack of claim 4, wherein the mount comprises the accommodation part, and the connector comprises the protrusion,
 wherein the protrusion protrudes from one or more of the expanded portions in the third direction,
 wherein the protrusion is a leaf spring having a circular arc shape in which a distance between arms of the leaf spring increases from a first distance to a second distance and then decreases to a third distance along the third direction, and
 wherein the accommodation part is an opening having a size that is smaller than second distance.

* * * * *